(12) United States Patent
Michalak et al.

(10) Patent No.: US 9,128,720 B2
(45) Date of Patent: Sep. 8, 2015

(54) METHODS AND APPARATUS FOR VOLTAGE SCALING

(75) Inventors: Gerald Paul Michalak, Cary, NC (US); Jeffrey Todd Bridges, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 581 days.

(21) Appl. No.: 13/183,129

(22) Filed: Jul. 14, 2011

(65) Prior Publication Data

US 2013/0019117 A1 Jan. 17, 2013

(51) Int. Cl.
*G06F 1/00* (2006.01)
*G06F 1/32* (2006.01)
*G06F 1/26* (2006.01)

(52) U.S. Cl.
CPC .............. *G06F 1/3296* (2013.01); *G06F 1/26* (2013.01); *Y02B 60/1285* (2013.01)

(58) Field of Classification Search
CPC .................................... G06F 9/32; G06F 9/26
USPC ......................................... 713/340, 320, 324
See application file for complete search history.

(56) References Cited

U.S. PATENT DOCUMENTS

| | | | |
|---|---|---|---|
| 6,748,545 B1 * | 6/2004 | Helms ........................... | 713/300 |
| 7,373,550 B2 | 5/2008 | Brawn et al. | |
| 7,581,120 B1 | 8/2009 | Hartman et al. | |
| 7,886,164 B1 * | 2/2011 | Alben et al. ................... | 713/300 |
| 2004/0032778 A1 * | 2/2004 | Yamashita ..................... | 365/220 |
| 2006/0280019 A1 | 12/2006 | Burton et al. | |
| 2007/0097620 A1 * | 5/2007 | Leech et al. ................... | 361/687 |
| 2007/0186128 A1 * | 8/2007 | Rambo et al. .................. | 714/47 |
| 2008/0155321 A1 | 6/2008 | Riedlinger et al. | |
| 2010/0094572 A1 | 4/2010 | Chase et al. | |
| 2010/0185888 A1 * | 7/2010 | Hahn et al. ..................... | 713/340 |
| 2010/0228402 A1 | 9/2010 | Mangione-Smith | |
| 2011/0004774 A1 | 1/2011 | Hansquine et al. | |
| 2011/0010567 A1 | 1/2011 | Schmitz et al. | |
| 2012/0159225 A1 * | 6/2012 | Fleischman et al. ........... | 713/340 |

FOREIGN PATENT DOCUMENTS

WO 2011003083 1/2011

OTHER PUBLICATIONS

DAS, "A Self-Tuning DVS Processor Using Delay-Error Detection and Correction," Department of EECS, University of Michigan, Ann Arbor, MI ARM Inc., Cambridge, UK.
International Search Report and Written Opinion—PCT/US2012/046905, ISA/EPO—Sep. 27, 2012.

* cited by examiner

*Primary Examiner* — Jaweed A Abbaszadeh
*Assistant Examiner* — Phil Nguyen
(74) *Attorney, Agent, or Firm* — Nicholas J. Pauley; Peter Michael Kamarchik; Paul Holdaway

(57) ABSTRACT

Methods and apparatus for voltage scaling are provided. In an example, an operational limit of a processor is determined by varying a supply voltage to force a processor interrupt fault and/or a processor reset. A clock frequency and the supply voltage can be maintained substantially constant for a time duration. If these operational parameters do not force the processor interrupt fault and/or the processor reset, the supply voltage is varied again, and the clock frequency and the supply voltage are maintained substantially constant for a second time duration. The variation continues until initiation of the processor interrupt fault and/or the processor reset, at which time least one of a clock frequency, the supply voltage, and a temperature are recorded as an operational limit. After determining the operational limit, the supply voltage is adjusted to within the operational limit.

25 Claims, 4 Drawing Sheets

METHODS AND APPARATUS FOR VOLTAGE SCALING

FIELD OF DISCLOSURE

This disclosure relates generally to electronics, and more specifically, but not exclusively, to apparatus and methods for voltage scaling.

BACKGROUND

Consumers demand that battery life of their mobile devices be extended without detrimentally affecting their user experience. Increasing battery life is beneficial, in that it extends a time between required battery charging and increases a time the consumer can use a device. Accordingly, conventional methods and apparatus to optimize power delivery include system-level power management, such as dynamic clock and voltage scaling (DCVS), in which software controls frequency and voltage scaling based on a stored table of values; automatic voltage scaling (AVS), in which hardware controls a voltage setting based on a speed of a delay synthesizer; and automatic clock scaling (ACS), in which a clock period is adjusted by hardware. In light of the consumer demand for increasing battery life, it is desirable to advance the state of the art over these conventional techniques by more accurately optimizing power delivery techniques and reducing power consumption.

Accordingly, there are long-felt industry needs for methods and apparatus that mitigate problems of conventional methods and apparatus, including improved methods and apparatus that improve performance and power savings.

SUMMARY

This summary provides a basic understanding of some aspects of the present teachings. This summary is not exhaustive in detail, and is neither intended to identify all critical features, nor intended to limit the scope of the claims.

In an example, methods and apparatus for voltage scaling are provided. An operational limit of a processor is determined by varying a supply voltage to force at least one of a processor interrupt fault and a processor reset. The determining can include maintaining a clock frequency and the supply voltage substantially constant for a time duration and varying the supply voltage subsequent to the end of the first time duration. The determining can include, subsequent to the second variation of the supply voltage, maintaining the clock frequency and the supply voltage substantially constant for a second time duration. The supply voltage is adjusted to within the operational limit. A clock frequency can be maintained substantially constant while the supply voltage is varied. Substantially at the moment of initiation of at least one of the processor interrupt fault and the processor reset, at least one of a clock frequency, the supply voltage, and a temperature are recorded. The processor interrupt fault can be at least one of an application timeout fault, an illegal instruction fault, and an illegal memory access fault. The method can further include maintaining a clock frequency substantially constant at a first frequency during the first varying of the supply voltage, changing the clock frequency to a second frequency, and determining, while the clock frequency is at the second frequency, a second operational limit of the processor by varying the supply voltage to force at least one of a processor interrupt fault and a processor reset. The method can also include maintaining a clock frequency and the supply voltage substantially constant for a time duration, varying the supply voltage subsequent to the end of the first time duration, and subsequent to the second variation of the supply voltage, maintaining the clock frequency and the supply voltage substantially constant for a second time duration.

In a further example, provided is a non-transitory computer-readable medium, comprising instructions stored thereon that, if executed by a processor, cause the processor to execute at least a part of the aforementioned method. The non-transitory computer-readable medium can be integrated with a mobile device or other device described herein.

In another example, provided is an apparatus configured to perform voltage scaling. The apparatus includes means for determining an operational limit of a processor by varying a supply voltage to force at least one of a processor interrupt fault and a processor reset and means for adjusting the supply voltage to within the operational limit. The means for determining can include means for maintaining a clock frequency and the supply voltage substantially constant for a time duration and means for varying the supply voltage subsequent to the end of the first time duration. The means for determining can further include means for maintaining, subsequent to the second variation of the supply voltage, the clock frequency and the supply voltage substantially constant for a second time duration. The processor interrupt fault can be at least one of an application timeout fault, an illegal instruction fault, and an illegal memory access fault. A clock frequency can be held substantially constant while the supply voltage is varied. The apparatus can include means for recording, substantially at the moment of initiation of at least one of the processor interrupt fault and the processor reset, at least one of a clock frequency, the supply voltage, and a temperature. The apparatus can also include means for maintaining a clock frequency substantially constant at a first frequency during the first varying of the supply voltage, means for changing the clock frequency to a second frequency, and means for determining, while the clock frequency is at the second frequency, a second operational limit of the processor by varying the supply voltage to force at least one of a processor interrupt fault and a processor reset. At least a part of the apparatus can be integrated on a semiconductor die. At least a part of the apparatus can be integrated with a mobile device. The apparatus can be integrated in a semiconductor die, and can be integrated into a device, selected from the group consisting of a settop box, music player, video player, entertainment unit, navigation device, communications device, personal digital assistant (PDA), fixed location data unit, and a computer. In a further example, provided is a non-transitory computer-readable medium, comprising instructions stored thereon that, if executed by a lithographic device, cause the lithographic device to fabricate at least a part of the apparatus.

In an example, provided is an apparatus configured to perform voltage scaling. The apparatus includes a processor and a memory storing instructions, that when executed by the processor, cause the processor to perform a method to determine an operational limit of the processor by varying a supply voltage to force at least one of a processor interrupt fault and a processor reset and adjusting the supply voltage to within the operational limit. The determining can include maintaining a clock frequency and the supply voltage substantially constant for a time duration and varying the supply voltage subsequent to the end of the first time duration. The determining can further include, subsequent to the second variation of the supply voltage, maintaining the clock frequency and the supply voltage substantially constant for a second time duration. The processor interrupt fault can be at least one of an application timeout fault, an illegal instruction fault, and an illegal memory access fault. The method can include maintaining a clock frequency substantially constant while the supply voltage is varied. The method can further include maintaining a clock frequency substantially constant at a first frequency during the first varying of the supply voltage, changing the clock frequency to a second frequency, and determining, while the clock frequency is at the second frequency, a second operational limit of the processor by varying the supply voltage to force at least one of a processor interrupt fault and a processor reset. The method can further include recording, substantially at the moment of initiation of at least one of the processor interrupt fault and the processor reset, at least one of a clock frequency, the supply voltage, and a temperature.

At least a part of the apparatus can be integrated on a semiconductor die. At least a part of the apparatus can be integrated with a mobile device. The apparatus can be integrated in a semiconductor die, and can be integrated into a device, selected from the group consisting of a settop box, music player, video player, entertainment unit, navigation device, communications device, personal digital assistant (PDA), fixed location data unit, and a computer. In a further example, provided is a non-transitory computer-readable medium, comprising instructions stored thereon that, if executed by a lithographic device, cause the lithographic device to fabricate at least a part of the apparatus.

The foregoing broadly outlines some of the features and technical advantages of the present teachings in order that the detailed description that follows may be better understood. Additional features and advantages are also described in the detailed description that follows. The conception and disclosed embodiments can be readily utilized as a basis for modifying or designing other structures for carrying out the same purposes of the present teachings. Such equivalent constructions do not depart from the technology of the teachings as set forth in the appended claims. The novel features which are characteristic of the teachings, together with objects and advantages, are better understood from the detailed description and the accompanying figures.

BRIEF DESCRIPTION OF THE DRAWINGS

The accompanying drawings are presented to describe examples of the present teachings, and are not provided as limitations.

Figure 1:
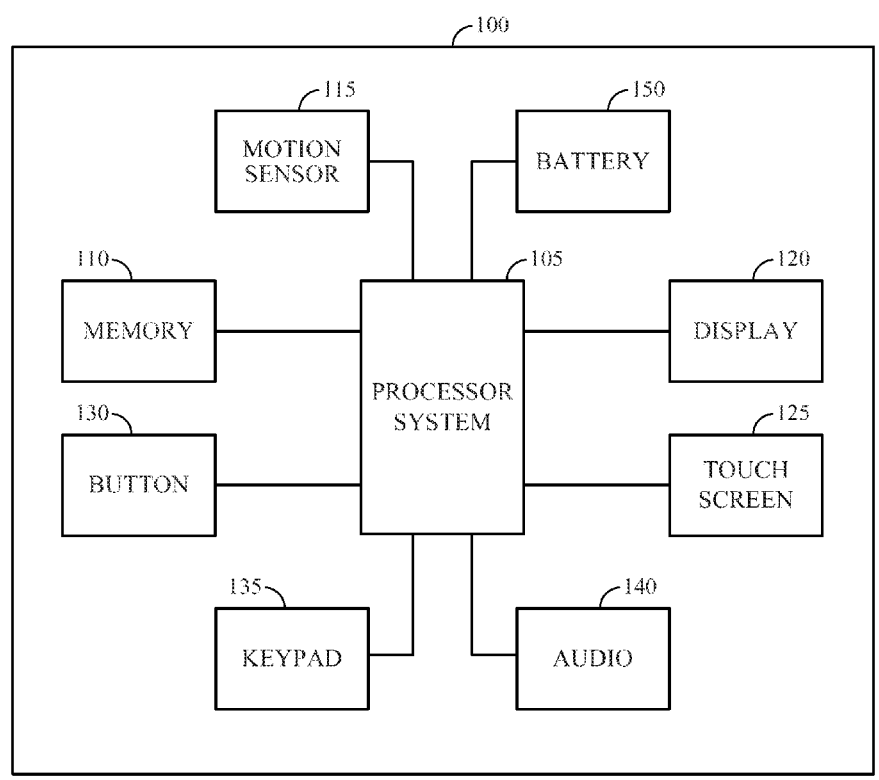
FIG. 1 is an exemplary block diagram of a mobile device.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Examples of the current teachings are disclosed in this application's text and related drawings. The examples advantageously address the long-felt industry needs, as well as other previously unidentified needs, and mitigate shortcomings of the conventional methods and apparatus. Alternate embodiments may be devised without departing from the scope of the invention. Additionally, conventional elements of the current teachings may not be described in detail, or may be omitted, to avoid obscuring aspects of the current teachings.

The word "exemplary" is used herein to mean "serving as an example, instance, or illustration." Any embodiment described as "exemplary" is not necessarily to be construed as preferred or advantageous over other embodiments. Likewise, the term "embodiments of the invention" does not require that all embodiments of the invention include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures.

It should be noted that the terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As employed herein, two elements can be considered to be "connected" or "coupled" together by the use of one or more wires, cables and/or printed electrical connections, as well as by the use of electromagnetic energy, such as electromagnetic energy having wavelengths in the radio frequency region, the microwave region, and/or the optical (both visible and invisible) region, for example.

It should be understood that the term "signal" can include any signal such as a data signal, audio signal, video signal, and/or multimedia signal. Information and signals can be represented using any of a variety of different technologies and techniques. For example, data, instructions, commands, information, signals, bits, and/or symbols that can be referenced throughout this description can be represented by voltages, currents, electromagnetic waves, magnetic fields or particles, optical fields or particles, and/or any combination thereof.

It should be understood that any reference to an element herein using a designation such as "first," "second," and so forth does not generally limit the quantity or order of those elements. Rather, these designations can be used herein as a convenient method of distinguishing between two or more elements or instances of an element. Thus, a reference to first and second elements does not mean that only two elements can be employed, or that the first element must precede the second element. Also, unless stated otherwise, a set of elements can comprise one or more elements. In addition, terminology of the form "at least one of: A, B, or C" used in the description or the claims means "A or B or C or any combination of these elements."

Terminology used herein is for the purpose of describing particular embodiments only and is not intended to be limiting of embodiments of the invention. For example, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In this description, certain terminology is used to describe certain features. The term "mobile device" includes, and is not limited to, a mobile phone, a mobile communication device, a personal digital assistant, a tablet computer, a mobile palm-held computer, a wireless device, electronic devices carried by individuals, and/or electronic devices having some form of communication capabilities (e.g., wireless, infrared, short-range radio, etc.).

Introduction

Methods and apparatus for voltage scaling are provided. The disclosed methods and apparatus minimize a supply voltage in a circuit, such as a processor, to an essentially minimum amount needed for proper operation. Voltage scaling actively explores limits of combinations of clock frequency and supply voltage applied to the circuit to determine operational limits of the specific device being tested. In an example, a processor controls a varying of a supply voltage to a level that forces a processor interrupt fault and/or a processor reset. During the variation process, a clock frequency and the supply voltage can be maintained substantially constant for a time duration. While held substantially constant, if the operational parameters do not force the processor interrupt fault and/or the processor reset, the next clock frequency and next supply voltage to be explored are stored in non-volatile storage. The supply voltage is varied again to the next clock frequency and next supply voltage, and the clock frequency and the supply voltage maintained substantially constant at the new operational parameters for a second time duration. Variation of the supply voltage continues until the variation initiates the processor interrupt fault and/or the processor reset, at which time least one of a clock frequency, the supply voltage, and a temperature are recorded as being outside of an operational limit. After determining the operational limit, the supply voltage and/or clock frequency are adjusted to a level that is within the operational limit. This process can be performed after the circuit has left control of the manufacturer, while the circuit is under a consumer end-user's control.

The disclosed methods and apparatus provide several advantages. One advantage is an improvement in power efficiency over conventional devices. Another advantage is calibration of power delivery to a specific device that accounts for the device's manufacturing process-related imperfections. Also, a device implementing the methods disclosed herein concurrently runs actual user software to provide a more accurate optimization and reduce power consumption to a substantially minimum level, when compared to conventional techniques.

Description of the Figures

FIG. 1 is an exemplary block diagram of a mobile device 100. The mobile device 100 can include a processor system 105, a memory 110, a motion sensor 115, and a display 120. The memory 110 (e.g., a non-volatile memory) stores instructions that, if executed by the processor system 105, cause the processor system 105 to perform at least a part of a method described herein. In an example, at least a part of the memory 110 is an integral part of the processor system 105. The mobile device 100 also includes devices and circuitry to accept user input, such as a touch screen 125, a button 130, a keypad 135, and/or an audio device 140 (e.g., a microphone). The mobile device 100 also includes devices and circuitry to provide output data, such as the display 120, and/or the audio device 140 (e.g., a speaker). The mobile device 100 is powered by a battery 150.

Figure 2:
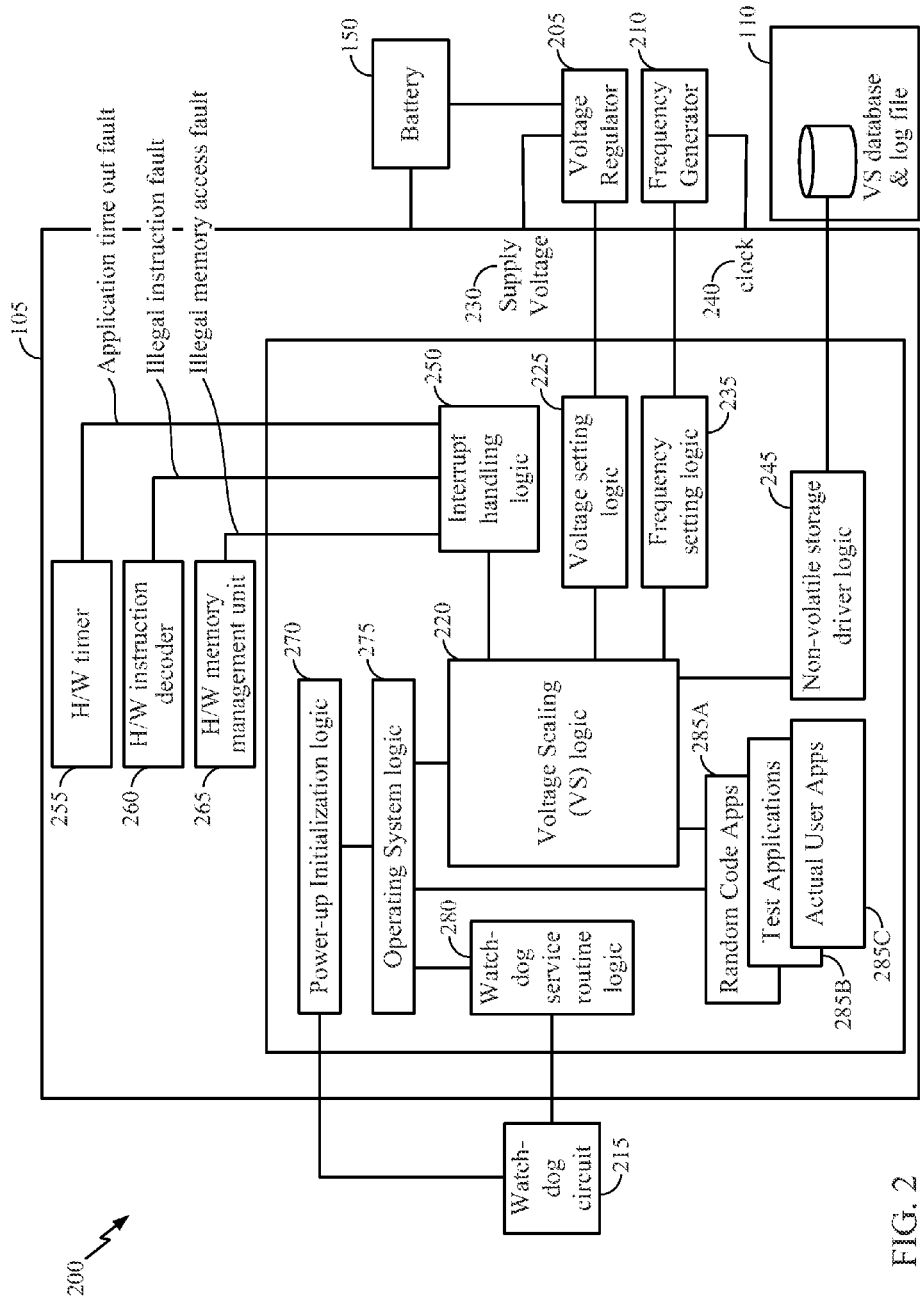
FIG. 2 is an exemplary block diagram of a sub-circuit of the mobile device.

FIG. 2 is an exemplary block diagram of a sub-circuit 200 of the mobile device 100.

The sub-circuit 200 includes the processor system 105, the memory 110, the battery 150, a voltage regulator 205, a frequency generator 210 (e.g., a clock frequency generator), and a watchdog circuit 215.

The processor system 105 includes logic configured to perform the methods described herein. Voltage scaling logic 220 controls voltage setting logic 225, which controls the voltage regulator 205 that supplies the supply voltage 230. The voltage scaling logic 220 also controls frequency setting logic 235, which controls the frequency generator 210 that supplies the clock 240. Further, the voltage scaling logic 220 also communicates with non-volatile storage driver logic 245 to write to, and read from, the memory 110. In the sub-circuit 200, the memory 110 stores a voltage scaling database and log file. The database and log file can include a recording of at least one of the clock frequency, the supply voltage, and a temperature, according to the methods described herein. Interrupt handling logic 250 interfaces the voltage scaling logic 220 with circuits that generate hardware faults, such as a hardware timer 255 that can generate an application timeout fault, a hardware instruction decoder 260 that can generate an illegal instruction fault, and a hardware memory management unit 265 that can generate illegal memory access fault.

Other logic within the processor system 105 includes power-up initialization logic 270, operating system logic 275, watchdog service routine logic 280, and exemplary application logic 285A-C.

Figure 3:
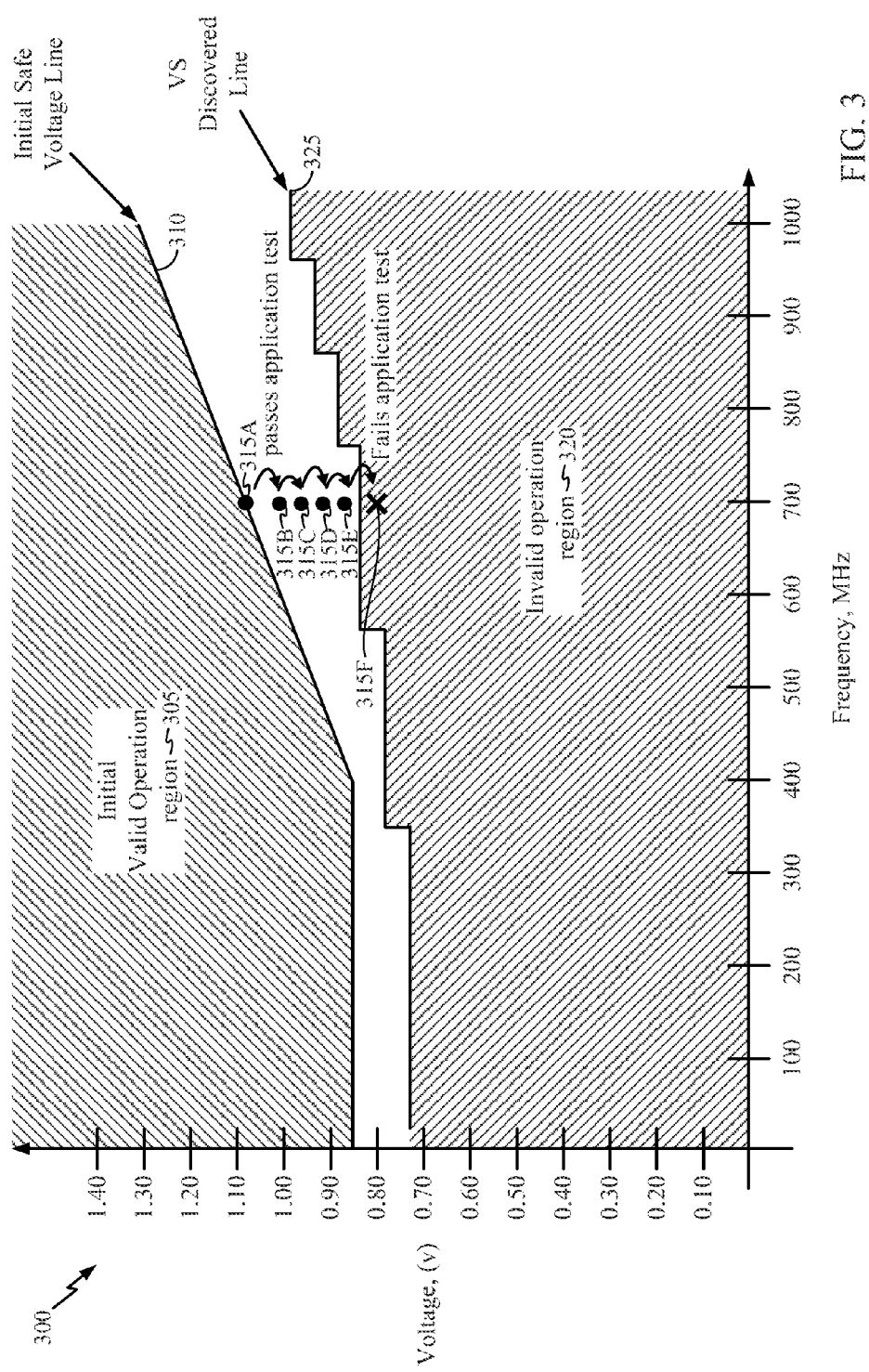
FIG. 3 depicts an exemplary chart of voltage scaling operation.

FIG. 3 depicts an exemplary frequency versus voltage chart 300 depicting a voltage scaling operation. The frequency versus voltage chart 300 includes an initial valid operation region 305 that is established during a device design process. When the processor system 105 operates with the frequency of the clock 240, and the supply voltage 230, in the initial valid operation region 305, the processor system 105 functions properly, but may not be operating at the most efficient operating parameters. The border 310 of the initial valid operating region 305 provides a collection of initial clock frequencies and corresponding supply voltages (i.e., operational parameters at an initial safe voltage line) from which the methods described herein can start. The memory 110 can store data describing the initial valid operation region 305 and the invalid operation region 320, as well as data (e.g., relating to points 315A-F) describing supply voltage, clock frequency data, and/or operating region information.

For example, voltage scaling performed at a frequency of 700 MHz is depicted in FIG. 3. The scaling starts at the point 315A, at which the frequency of the clock 240, and the supply voltage 230, are maintained substantially constant for a first time duration. The scaling can start in the initial valid operating region 305, or outside of the initial valid operating region 305. The scaling can also include retrieving stored data describing valid and invalid operating points and/or regions.

During the first time duration, there are no processor interrupt faults or processor resets. The operating parameters of the point 315A are recorded in the memory 110 as being a valid operation region that is in addition to all other known valid operating regions. The operational parameters do not force the processor interrupt fault and/or the processor reset, thus, the next clock frequency and/or next supply voltage to be explored (i.e., point 315B) are stored in non-volatile storage. The next clock frequency and/or next supply voltage to be explored are stored in case the next clock frequency and/or next supply voltage to be explored causes a reset.

The voltage scaling logic 220 then varies the supply voltage 230 to the point 315B, at which the frequency of the clock 240, and the supply voltage 230, are maintained substantially constant for a second time duration. During the second time duration, there are no processor interrupt faults or processor resets. The operating parameters of the point 315B are recorded in the memory 110 as being in a valid operation region that is in addition to all other known valid operating regions. The operational parameters do not force the processor interrupt fault and/or the processor reset, thus, the next clock frequency and/or next supply voltage to be explored (i.e., point 315C) are stored in non-volatile storage.

The voltage scaling continues at points 315C-E without processor interrupt faults or processor resets during the respective third through fifth time durations. The operating parameters of the points 315C-E are recorded in the memory 110 as being in a valid operation region that is in addition to all other known valid operating regions. The operational parameters do not force the processor interrupt fault and/or the processor reset, thus, the next clock frequency and/or next supply voltage to be explored (i.e., point 315D) are stored in non-volatile storage.

When the voltage scaling logic 220 varies the supply voltage 230 to point 315F, the exemplary application logic 285A-C does not operate properly (e.g., an instruction decode fault is detected). The operating parameters of the point 315F are recorded in the memory 110 as being in the invalid operation region 320. The scaling process can be repeated at a different frequency to determine the valid and invalid operating regions at that different frequency. Multiple iterations of the scaling process performed across a band of frequencies forms the voltage scaling discovered line 325. After determining the invalid operating region 320 for the supply voltage 230, the supply voltage 230 is set to a voltage that is within the operating limit (e.g., above the VS discovered line 325 in FIG. 3). The combination of supply voltage and clock frequency can be set to a valid operation point that optimizes processor performance and power consumption.

Figure 4:
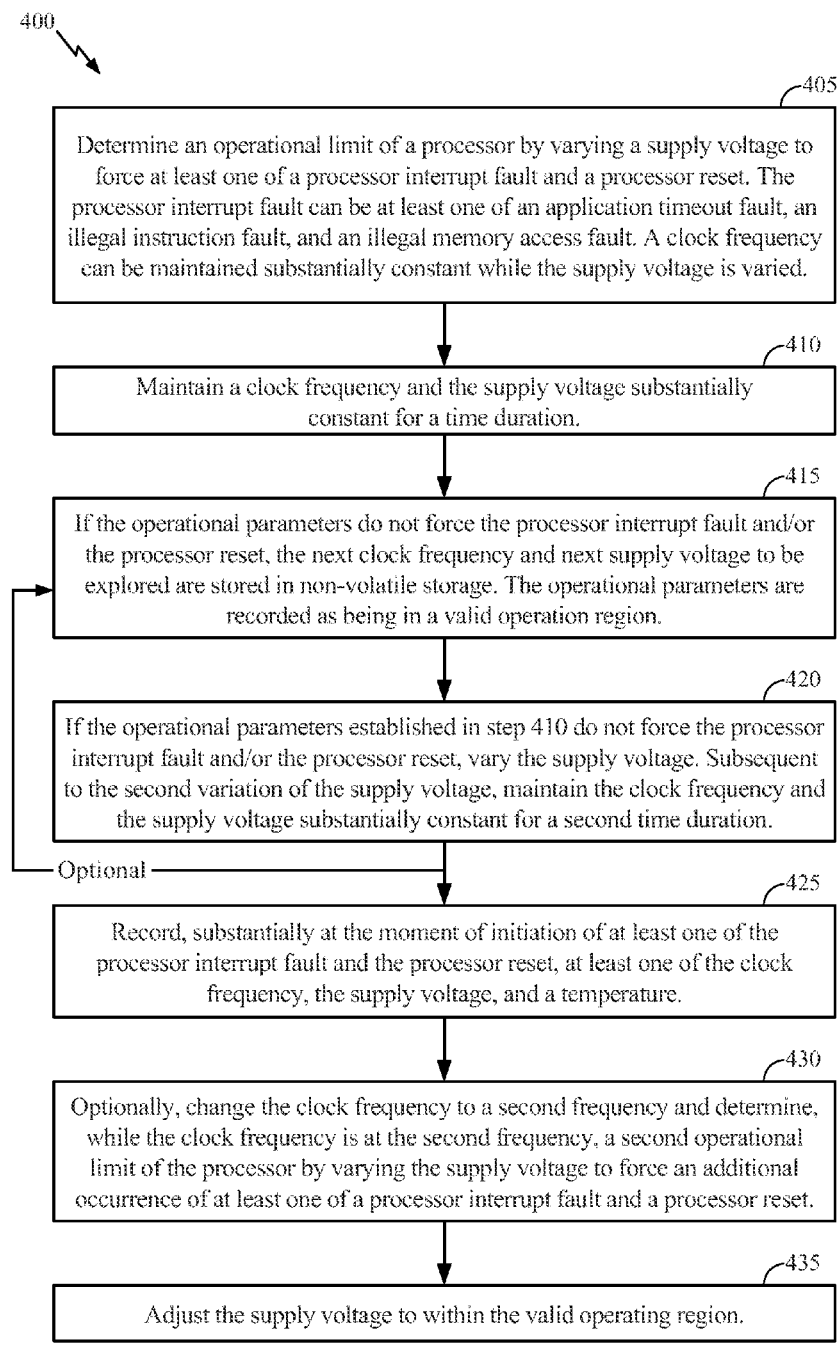
FIG. 4 depicts an exemplary method for voltage scaling.

FIG. 4 depicts an exemplary method for voltage scaling 400. The method for voltage scaling 400 can be performed by the apparatus described hereby, such as the processor system 105 and/or other circuits integrated with the mobile device 100.

In step 405, an operational limit of a processor is determined by varying a supply voltage to force at least one of a processor interrupt fault and a processor reset. The processor interrupt fault can be at least one of an application timeout fault, an illegal instruction fault, and an illegal memory access fault. A clock frequency can be maintained substantially constant while the supply voltage is varied.

In step 410, a clock frequency and the supply voltage are maintained substantially constant for a time duration.

In step 415, if the operational parameters do not force the processor interrupt fault and/or the processor reset, the next clock frequency and next supply voltage to be explored are stored in non-volatile storage. The operational parameters are recorded as being in a valid operation region that is in addition to all other known valid operating regions.

In step 420, if the operational parameters established in step 410 do not force the processor interrupt fault and/or the processor reset, the supply voltage is varied again. Subsequent to the additional variation of the supply voltage, the clock frequency and the supply voltage are maintained substantially constant for a second time duration. Optionally, repeat step 415.

In step 425, substantially at the moment of initiation of at least one of the processor interrupt fault and the processor reset, at least one of the clock frequency, the supply voltage, and/or a temperature are recorded.

In optional step 430, the clock frequency is changed to a second frequency and, while the clock frequency is at the second frequency, a second operational limit of the processor is determined by varying the supply voltage to force an additional occurrence of at least one of a processor interrupt fault and a processor reset.

In step 435, the supply voltage is adjusted to within the valid operation region. At least one recording of the clock frequency, the supply voltage, and/or the temperature can form a basis for the adjustment.

In some aspects, the teachings herein can be employed in a mobile device capable of supporting communication. For example, the teachings herein can be applied to a mobile device that is configured to use any one (or combinations) of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A mobile device employing the teachings herein can be designed to implement one or more standards, such as IS-95, cdma2000, IS-856, W-CDMA, TDSCDMA, and other standards. A CDMA network can implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein can be implemented in a mobile device that is configured to use a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure can be described using 3GPP terminology, it is to be understood that the teachings herein can be applied to 3GPP (e.g., Rel99, Rel5, Rel6, Rel7) technology, as well as 3GPP2 (e.g., 1×RTT, 1×EV-DO RelO, RevA, RevB) technology and other technologies. The techniques can be used in a mobile device that is configured to use emerging and future networks and interfaces.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Further, many embodiments are described in terms of sequences of actions to be performed by, for example, elements of a computing device. It will be recognized that various actions described herein can be performed by specific circuits (e.g., application specific integrated circuits (ASICs)), by stored program instructions being executed by one or more processors, or by a combination of both. Additionally, the sequence of actions described herein can be embodied entirely within any form of computer-readable storage medium having stored therein a corresponding set of computer instructions that upon execution cause a processor to perform at least a part of the functions described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Nothing that is stated or depicted in this application is intended to cause a dedication of any component, step, feature, object, benefit, advantage, or an equivalent to the public, regardless of whether the component, step, feature, object, benefit, advantage, or their equivalent is recited in the claims.

While this disclosure describes exemplary embodiments of the invention, it should be noted that various changes and modifications can be made without departing from the scope of the invention as defined by the appended claims. The functions, steps, and/or actions of the method claims in accordance with the embodiments of the invention described herein need not be performed in any particular order.

What is claimed is:

1. A method for voltage scaling, comprising:
   for a plurality of clock frequencies within a frequency band, repeating the steps of:
   determining a threshold operating supply voltage at a corresponding one of said plurality of clock frequencies of a processor by varying a supply voltage to the processor until a processor interrupt fault occurs when a temperature is outside of an operational limit, wherein the processor interrupt fault is at least one of an application timeout fault, an illegal instruction fault, and an illegal memory access fault; and
   recording the threshold operating supply voltage and the corresponding clock frequency;
   determining a valid operating region and an invalid operating region based on a plurality of threshold operating supply voltages within the frequency band;
   and at a selected clock frequency within the frequency band, adjusting the supply voltage to a voltage within the valid operating region.

2. The method of claim 1, further comprising recording, substantially at the moment of initiation of at least one of the processor interrupt fault and the processor reset, at least one of a clock frequency, the supply voltage, and a temperature.

3. The method of claim 1, wherein the step of determining the threshold operating supply voltage includes:
   maintaining a clock frequency and the supply voltage substantially constant for a first time duration; and
   varying the supply voltage subsequent to the end of the first time duration.

4. The method of claim 3, wherein the step of determining the threshold operating supply voltage further includes: subsequent to the end of the first time duration, maintaining the clock frequency and the supply voltage substantially constant for a second time duration.

5. The method of claim 1, wherein a clock frequency is maintained substantially constant while the supply voltage is varied.

6. An apparatus configured to perform voltage scaling, comprising:
   means for determining a threshold operating supply voltage at a corresponding one of a plurality of clock frequencies within a frequency band of a processor by varying a supply voltage to the processor until a processor interrupt fault occurs when a temperature is outside of an operational limit, wherein the processor interrupt fault is at least one of an application timeout fault, an illegal instruction fault, and an illegal memory access fault;
   means for recording the threshold operating supply voltage and the corresponding clock frequency;
   means for determining a valid operating region and an invalid operating region based on a plurality of threshold operating supply voltages within the frequency band; and
   means for adjusting the supply voltage to a voltage within the valid operating region at a selected clock frequency within the frequency band.

7. The apparatus of claim 6 further comprising means for recording, substantially at the moment of initiation of at least one of the processor interrupt fault and the processor reset, at least one of a clock frequency, the supply voltage, and a temperature.

8. The apparatus of claim 6, wherein the means for determining the threshold operating supply voltage includes:
   means for maintaining a clock frequency and the supply voltage substantially constant for a first time duration; and
   means for varying the supply voltage subsequent to the end of the first time duration.

9. The apparatus of claim 8, wherein the means for determining the threshold operating supply voltage further includes:
   means for maintaining, subsequent to the end of the first time duration, the clock frequency and the supply voltage substantially constant for a second time duration.

10. The apparatus of claim 6, further comprising means for maintaining a clock frequency substantially constant while the supply voltage is varied.

11. The apparatus of claim 6, wherein at least a part of the apparatus is integrated on a semiconductor die.

12. The apparatus of claim 6, wherein at least a part of the apparatus is integrated with a mobile device.

13. An apparatus configured to perform voltage scaling, comprising:
   a processor; and a memory storing instructions, that when executed by the processor, cause the processor to perform a method to determine an operational limit of the processor, comprising:
   for a plurality of clock frequencies within a frequency band, repeating the steps of:
   determining a threshold operating supply voltage at a corresponding one of said plurality of clock frequencies by varying a supply voltage to the processor until a processor interrupt fault occurs when a temperature is outside of an operational limit, wherein the processor interrupt fault is at least one of an application timeout fault, an illegal instruction fault, and an illegal memory access fault;

recording the threshold operating supply voltage and the corresponding clock frequency;

determining a valid operating region and an invalid operating region based on a plurality of threshold operating supply voltages within the frequency band;

and at a selected clock frequency within the frequency band, adjusting the supply voltage to a voltage within the valid operating region.

14. The apparatus of claim 13, wherein the method further comprises recording, substantially at the moment of initiation of at least one of the processor interrupt fault and the processor reset, at least one of a clock frequency, the supply voltage, and a temperature.

15. The apparatus of claim 13, wherein the step of determining the threshold operating supply voltage includes:

maintaining a clock frequency and the supply voltage substantially constant for a first time duration; and varying the supply voltage subsequent to the end of the first time duration.

16. The apparatus of claim 15, wherein the step of determining the threshold operating supply voltage further includes:

subsequent to the end of the first time duration, maintaining the clock frequency and the supply voltage substantially constant for a second time duration.

17. The apparatus of claim 13, wherein the method further comprises maintaining a clock frequency substantially constant while the supply voltage is varied.

18. The apparatus of claim 13, wherein at least a part of the apparatus is integrated on a semiconductor die.

19. The apparatus of claim 13, wherein at least a part of the apparatus is integrated with a mobile device.

20. A non-transitory computer-readable medium, comprising instructions stored thereon that, if executed by a processor, cause the processor to perform a method comprising:

for a plurality of clock frequencies within a frequency band, repeating the steps of:

determining a threshold operating supply voltage at a corresponding one of said plurality of clock frequencies of a processor by varying a supply voltage to the processor until a processor interrupt fault occurs when a temperature is outside of an operational limit, wherein the processor interrupt fault is at least one of an application timeout fault, an illegal instruction fault, and an illegal memory access fault; and recording the threshold operating supply voltage and the corresponding clock frequency;

determining a valid operating region and an invalid operating region based on a plurality of threshold operating supply voltages within the frequency band; and at a selected clock frequency within the frequency band, adjusting the supply voltage to a voltage within the valid operating region.

21. The non-transitory computer-readable medium of claim 20, wherein the method further comprises recording, substantially at the moment of initiation of at least one of the processor interrupt fault and the processor reset, at least one of a clock frequency, the supply voltage, and a temperature.

22. The non-transitory computer-readable medium of claim 20, wherein the step of determining the threshold operating supply voltage includes:

maintaining a clock frequency and the supply voltage substantially constant for a first time duration; and varying the supply voltage subsequent to the end of the first time duration.

23. The non-transitory computer-readable medium of claim 22, wherein the step of determining the threshold operating supply voltage further includes:

subsequent to the-end of the first time duration, maintaining the clock frequency and the supply voltage substantially constant for a second time duration.

24. The non-transitory computer-readable medium of claim 20, wherein a clock frequency is maintained substantially constant while the supply voltage is varied.

25. The non-transitory computer-readable medium of claim 20, wherein the non-transitory computer-readable medium is integrated with a mobile device.

* * * * *